May 14, 1940.  L. HAGA  2,200,272
POULTRY FOUNTAIN
Filed March 30, 1939   2 Sheets-Sheet 1

Inventor
Lars Haga

By Clarence A. O'Brien
and Hyman Berman
Attorneys

May 14, 1940.  L. HAGA  2,200,272
POULTRY FOUNTAIN
Filed March 30, 1939  2 Sheets-Sheet 2
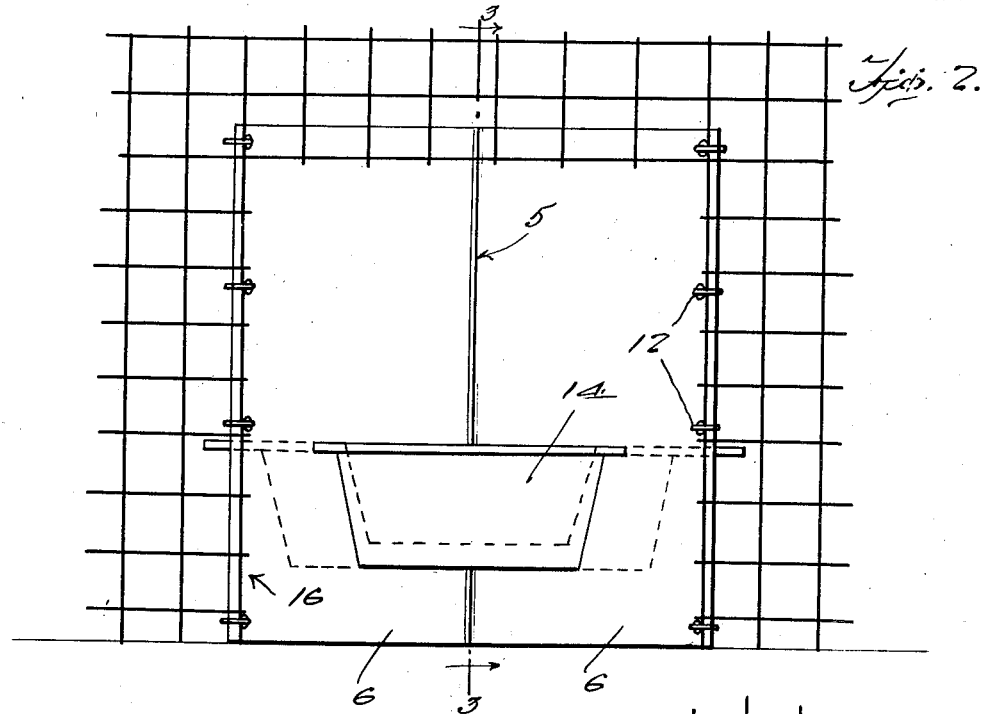
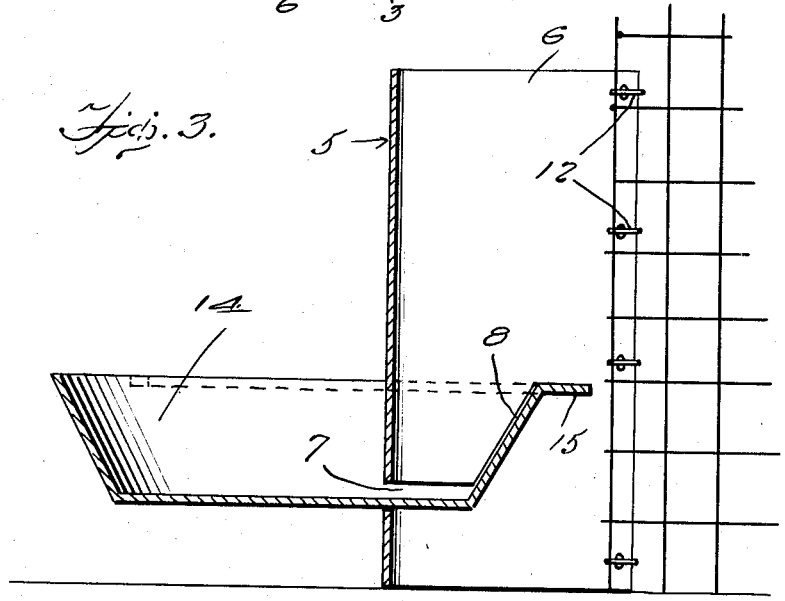
Inventor
Lars Haga
By Clarence A. O'Brien
and Hyman Berman
Attorneys Patented May 14, 1940

2,200,272

UNITED STATES PATENT OFFICE 2,200,272

POULTRY FOUNTAIN

Lars Haga, Plummer, Minn.

Application March 30, 1939, Serial No. 265,029

3 Claims. (Cl. 119—72)

This invention relates to poultry fountains and an object of the invention is to provide a fountain of this character which can be readily associated with a cage for poultry, animals, or the like, to provide for the watering thereof.

Also in accordance with the present invention there is provided a poultry or watering fountain which can be cheaply constructed and also readily set up for use.

The invention together with its objects and advantages will be best understood from a study of the following description taken in connection with the accompanying drawings wherein:

Figure 2 is an elevational view thereof.

Figure 3 is a vertical sectional view taken substantially on the line 3—3 of Figure 2.

Referring more in detail to the drawings it will be seen that in the preferred embodiment thereof the improved watering or drinking fountain comprises a supporting member 5 in the form of a plate of tin, or other suitable metal that is bent into a substantial V form to provide a pair of angularly related wings 6—6.

Figure 1:
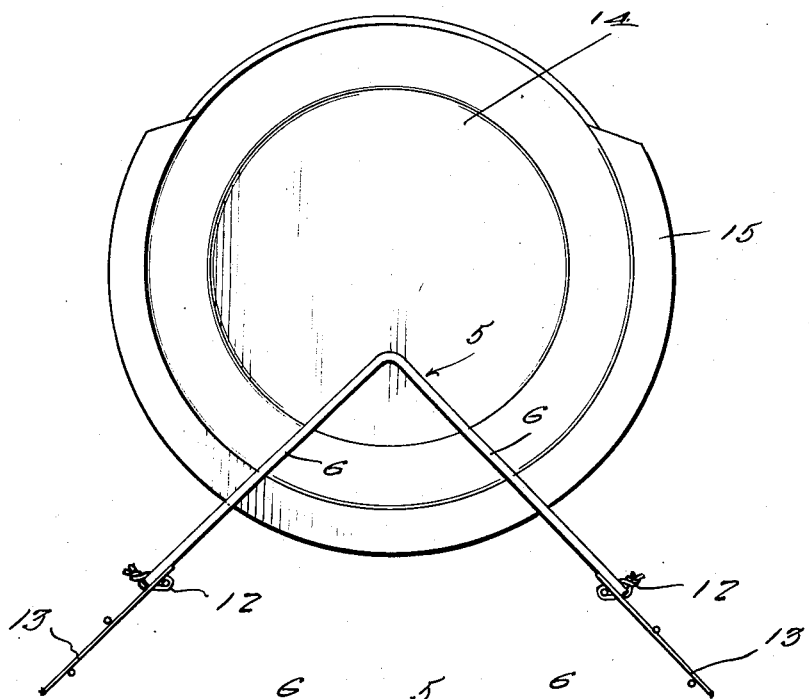
Figure 1 is a top plan view illustrating the application of the invention.
Figure 4:
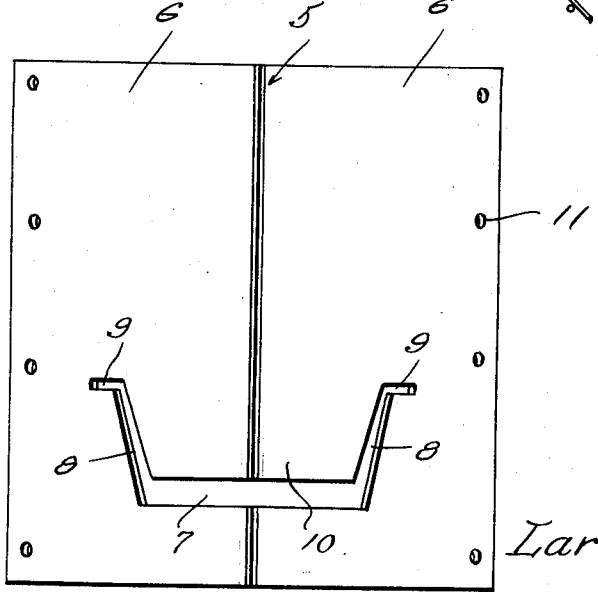
Figure 4 is an elevational view of a supporting member forming part of the invention.

The plate 5 adjacent the bottom thereof is provided with a pan receiving opening which includes the horizontal slot-like part 7 which extends through the apex portion of the plate, the upwardly and outwardly extending portions 8 leading from the ends of the slot 7 tapering upwardly and each portion 8 having a short horizontal extension 9 at its upper end, each part 8 and 9 being in a wing of the plate and as will be seen from Figure 4 the opening when viewed from the front or rear of the plate is roughly of a shape similar to the cross-sectional shape of a pan. At their free vertical edges the wings 6 of the plate are provided with apertures 11 through the medium of which and wire strands or the like 12 the member 5 is secured to the wire wall 13 of a cage or other enclosure for the fowl, animals, or the like.

Adapted to be removably mounted on the plate 5 is a relatively shallow pan 14 adapted to contain water.

The rim of the pan 14 for the major portion of the periphery of the pan is provided with an outstanding flange 15.

In mounting the pan 14 on the plate or supporting member 5 a portion of the pan is inserted through the slot 7 with the flange 15 being accommodated in the extensions 9 of the parts 8 of the opening, and the rim or wall of the pan being accommodated in said parts 8 and the integral apron or tongue 10 extending down into the pan as shown in the drawings to cooperate with the walls of the opening for supporting the pan 14 in substantially horizontal position with a section of the pan between the wings 6 of the plate being accessible to the fowl, animals or other inhabitants of the pen so that the latter may drink of the water in the pan, in an obvious manner.

In connection with the above it will be understood that when inserting the pan in the opening the portion of the pan characterized by the absence of the flange 15 is first inserted through the opening after which the pan is then rotated for bringing the flange 15 into the extensions 9.

Also, as shown in Fig. 3, the lower edge of the skirt or shield 10 terminates upwardly from the bottom of the pan 14 so as to insure the maintaining of the same water level in both parts of the pan which are partly separated by the depending part 10 of the plate.

In actual practice a suitable opening 16 is cut into the wall of the cage and opposite the opening is placed the plate 5 with the apertured edges of the wings 6 disposed against the wall of the cage at opposite sides of the opening 16; the plate 5 being secured in position opposite the opening 16 by tying the wings 6 of the plate to the walls of the cage through the medium of strands of wire 12, or other suitable fastening elements.

It will be apparent that the pan 14 may be easily removed for cleaning the same and without disturbing the position of the supporting plate 5.

Thus it will be seen that I have provided a watering or poultry fountain that is of simple construction, can be readily set up, and can be readily associated with a cage, pen, or the like, so that the water contents thereof may be readily accessible to the occupants of such enclosure.

It is thought that a clear understanding of the construction, utility and advantages of an invention of this character will be had without a more detailed description.

Having thus described the invention what is claimed as new is:

1. In a device of the class described, a vertically arranged barrier member of substantially trough-shape in plan to provide a bight and a pair of wings, said member having a pan receiving opening therein, said opening including a horizontal slot-like part passing through the bight and portions of the wings, the bottom wall of said slot-like part forming a seat for the bottom of a pan and said opening also including upwardly extending slot-like portions located in the wings and having their lower ends connected with the horizontal part, said upwardly extending portions receiving portions of the side walls of a pan with that part of the member between the horizontal and upwardly extending parts of the opening depending into the pan.

2. In a device of the class described, a vertically arranged barrier member of substantially trough-shape in plan and having a pan receiving opening in its lower part, a pan passing through the opening, said opening including a horizontal slot-like portion passing through the bight and through adjacent portions of the wings formed by the trough-shaped part, the lower wall of said slot forming a seat for a portion of the bottom of the pan, said opening also including upwardly and outwardly extending slot-like portions having their lower ends in communication with the horizontal part and said upwardly extending portions being located in said wings and having outwardly extending horizontal parts, the upwardly extending portions of the opening receiving portions of the side walls of the pan and said pan having an outwardly extending rim at its top which only extends around a part of the pan, said rim being adapted to engage the outwardly extending parts of the opening at the upper ends of the upwardly extending portions by rotating the pan after that part of the pan which does not have the flange thereon has been inserted into the opening to bring the flange into said outwardly extending portions of the opening.

3. In combination with an enclosure having an opening in a wall thereof, a vertically arranged V-shaped plate closing said opening, said plate having a pan receiving opening therein which includes a horizontal slot-like portion passing through the bight into the wings of the plate and upwardly and outwardly extending slot-like portions in said wings having their lower ends connected with the ends of the horizontal part and said opening also including short horizontally arranged parts connected with the upper ends of the upwardly extending parts and a pan including a bottom and an upwardly and outwardly extending wall with an outwardly extending flange at the top of the wall, said flange only extending around a part of the pan the bottom of the pan resting on the bottom wall of the horizontal part of the slot when the pan is inserted into the pan receiving opening by inserting into said opening that part of the pan which does not have the flange, with portions of the side walls passing through the upwardly extending portions of the opening, the pan being rotated after being inserted in the opening to bring the flange into engagement with the short upper portions of the opening.

LARS HAGA.